United States Patent [19]
Gerk et al.

[11] Patent Number: 5,630,379
[45] Date of Patent: May 20, 1997

[54] ELECTRICALLY CONTROLLED SPRAYING DEVICE FOR CLEANING AND TREATING ANIMALS

[75] Inventors: John K. Gerk; W. Michael Ryden, both of Julesburg, Colo.

[73] Assignee: SSI Corporation, Julesburg, Colo.

[21] Appl. No.: 660,871

[22] Filed: Jun. 10, 1996

Related U.S. Application Data

[63] Continuation-in-part of Ser. No. 601,075, Feb. 12, 1996.
[51] Int. Cl.$^6$ .................................................. A01K 13/00
[52] U.S. Cl. .................................................. 119/667; 119/669
[58] Field of Search ........................ 119/666, 667, 119/668, 669, 670, 671

[56] References Cited

U.S. PATENT DOCUMENTS

| | | | |
|---|---|---|---|
| 1,055,289 | 3/1913 | Nolan | 119/667 |
| 1,273,311 | 7/1918 | Barnes | 119/667 |
| 2,684,658 | 7/1954 | Richardson et al. | 119/669 |
| 3,763,828 | 10/1973 | Tighe | 119/158 |
| 3,884,191 | 5/1975 | Stout | 119/671 |
| 3,884,192 | 5/1975 | Knapp | 119/159 |
| 4,126,104 | 11/1978 | Overby | 119/667 |
| 4,334,504 | 6/1982 | Matthews | 119/159 |
| 4,342,285 | 8/1982 | James | 119/669 |
| 4,987,861 | 1/1991 | Lemire et al. | 119/159 |
| 5,063,880 | 11/1991 | Bouthillier | 119/159 |
| 5,213,064 | 5/1993 | Mondine et al. | 119/671 |

Primary Examiner—Robert P. Swiatek
Assistant Examiner—Elizabeth Shaw
Attorney, Agent, or Firm—Suzanne F. Seavello; Hopkins & Carley

[57] ABSTRACT

A low maintenance, electrically controlled automatic spray bath employs a spray system to wash animals and subsequently deliver treatment and prevention products at a continuous, consistent dosage rate. The automatic spray bath comprises at least one component. Each component comprises four rails defining an enclosure through which animals are walked in one direction, one after the other. Each rail of each component has a plurality of nozzles. When one component is employed the nozzles are divided into sets. Each set of nozzles sprays either a cleaning fluid or a treatment fluid. When more than one component is employed, the nozzles of each component spray either a cleaning fluid or a treatment fluid. The components are modular and portable. As animals are led between a set of nozzles, an electric eye beam is broken, causing a check valve to allow liquid to flow from a remote reservoir. Nozzles delivering the liquid are located and correctly pressurized to spray a particular part of an animal, for example, the hooves of a cow and not the udder. The rails of the automatic spray bath are mounted above the floor for continually flushing debris washed from the animal under the rails and out of the component enclosure. The nozzles have check valves to prevent the liquid from draining from the supply lines. The treatment solution is delivered to nozzles by a metering device which ensures that each animal is exposed to the correct dosage.

20 Claims, 6 Drawing Sheets

FIG.-8 ns to the hooves of
ELECTRICALLY CONTROLLED SPRAYING DEVICE FOR CLEANING AND TREATING ANIMALS This application is a continuation-in-part of application Ser. No. 08/601,075, filed Feb. 12, 1995, pending.

BACKGROUND OF THE INVENTION

1. Field of the Invention

This invention relates to a device for spraying animals and more particularly to an electrically controlled automatic spraying device for cleaning and chemically treating animals.

2. Previous Art

Hairy warts (digital dermatitis) is a hard-to-treat condition that can remove cattle from production for extended periods of time. Effects of hairy wart lesions on dairy cattle include severe lameness, walking on toes, clubbed hooves, loss of body weight, decreased milk yield and decreased fertility. Extended infection of hairy warts causes economic loss to dairy producers.

Although the precise cause of this wartlike disease is unknown, significant progress has been made in understanding the disease process. Scientific names include papillomatous digital dermatitis, digital papillomatosis and digital dermatitis. Common names include foot warts, heel warts, hairy foot warts, strawberry foot disease and raspberry heel.

Additional foot problems for livestock include sole ulcers, foot rot, heel cracks and white line separations.

Control of hairy warts and associated foot diseases has proven difficult. One form of control is to treat the larger clinically active lesions, which are a source of infection, by surgical removal. Additional treatments for complete healing may be necessary. This process is laborious, time consuming and expensive, particularly when dealing with large herds.

Autogenous Wart vaccines have proven ineffective. Formalin foot bathing fixates living tissues and inhibits the healing process.

Topical application of acidic solutions or antibiotics have been found to be effective. For any topical treatment to be successful it is important to clean the affected areas to provide good exposure of the lesion and penetration of the treatment solution. Another type of topical solution is a treated foam which adheres to the hooves. Individual cleaning of hooves and subsequent application of topical solutions is also laborious, time consuming and expensive.

For easy application of topical solutions to the hooves of many animals, foot baths have been employed. Most commercial foot baths are thirty inches wide, four feet long and six inches deep. These commercial foot baths hold approximately thirty five gallons of treatment solution. Most "home-made" baths are also constructed to be about the same length as commercial foot baths.

The animals are walked through the foot bath while either entering or exiting particular areas, such as milking parlors, shearing stalls, feeding stalls, etc. Products commonly used in foot baths to treat foot problems include copper sulfate, formaldehyde, zinc sulfate and rock salt.

If antibiotics are used, treatment solutions in the foot bath are rotated to allow the antibiotics to be spread out over a period of time to decrease resistance build-up.

Although foot baths are easy to use, they are not the most effective method of treatment and prevention of foot diseases. Foot baths are inefficient and costly for several reasons, some of which are outlined below.

First, experimentation and experience have shown that the length of the foot bath is directly correlated to the effectiveness of the treatment solution. The longer the bath, the greater the duration of exposure to the treatment and prevention solution. Applicants have found that the commonly used four foot long baths are not long enough for proper cleaning of the feet and subsequent exposure of the lesions to the treatment solution.

Second, as the animals enter the foot bath there is a high probability that manure attached to the animals hooves will be carried into the foot bath or that the animal will defecate into the treatment solution. Foot baths are liquid filled reservoirs that hold all environmental contaminants. The manure rapidly degrades the treatment solution and renders it ineffective.

Third, depending upon environmental conditions, the animals may also have layers of mud and dirt clinging to the feet. On average, animals walk through a traditional foot bath for five seconds or less. This is not enough time to effectively clean the hooves to allow proper exposure to the treatment solution.

Fourth, a high level of management of the foot bath is required. The treatment solution must be changed at specified intervals to maintain efficacy of the treatment solution after several animals pass through the bath. Also, different types of foot diseases require different types of treatment and prevention products and therefore different degrees of foot bath management. If the foot bath is not changed and re-charged accordingly, the efficacy of the treatment solution is greatly reduced. Applicants have found that more than fifty percent of the foot baths in use are not properly managed. Therefore, the animals receive little or no benefit from the treatment solution.

Fifth, animals experiencing foot problems generally walk slower than healthy animals. Therefore, the afflicted animals are the last animals through the foot bath, when the bath is at its most inefficient, rather than the first animals through the bath, when the bath is the most effective.

Sixth, many of the products available for the treatment and prevention of foot diseases are not labeled for use in foot bath applications and/or are difficult to get into solution, for example, copper sulfate and zinc sulfate.

Seventh, many products do not lend themselves well for a foot bath type of application, such as antibiotics. Antibiotics degrade quickly when exposed to organic material.

Eighth, most foot baths are permanently fixed. This prevents a farmer from locating the bath at different locations on the facility which may be more advantageous for foot bath usage from time to time.

Ninth, most foot baths are not modular for providing the farmer with the option of using the wash portion located separately form the treatment portion. Modularity also gives the buyer the option of which freight company is best for delivery of the device because the buyer is not limited by particular size and weight constraints of various freight companies.

In summary, Applicants have found that improper management, organic contamination, improper use of treatment and prevention products, and the tendency for target animals to be the last through the foot bath, all greatly reduce the efficacy and cost effectiveness of foot baths.

Therefore, there is a great need for an apparatus to provide more effective application of foot disease treatment solutions that are easy to use, even for producers having large herds.

Devices with various mechanisms that trigger automatic spraying of animals such as U.S. Pat. Nos. 5,063,880; 4,987,861; 4,334,504 and 3,884,192 have been utilized in animal husbandry. Each of these patents is designed to spray the entire body of an animal with a small amount of toxic chemicals, such as insecticides or disinfectants for controlling cattle grubs, face flies, heel flies, infectious pink eye and lice. The devices are not suitable for use with disease prevention and treatment solutions because 1) they spray a small amount of a solution on an animal that, 2) has not been cleaned. In order for a treatment solution to be effective, it must be applied to cleaned wounds and lesions and in an amount sufficient to affect the area. Additionally, disinfectants and pesticides are non-corrosive, while treatment solutions tend to be corrosive. Therefore, the use of treatment solutions in the insecticide spraying devices would degrade the seals employed in the valves and pumps in these devices.

Additionally, these devices are unsuitable for treating dairy cattle because they will allow chemicals to cover the udder of an animal. If the udder is sprayed with insecticides or disinfectants, the likelihood of residuals contaminating the milk produced is increased.

U.S. Pat. No. 3,763,828 is specifically designed for spraying liquid on the udder of an animal. It is not designed or able to deliver a solution to any other parts of an animal for treatment and prevention of diseases.

Also, the aforementioned devices do not take into consideration the importance of precleaning an animal to increase exposure of infected areas to the treatment solutions being applied. Precleaning is especially important because the animals usually have manure, mud or other organic materials covering the damaged areas, which must be cleaned off before application of the treatment and prevention solutions for effectiveness of the solutions.

What is needed is a device which is highly effective at preventing and treating diseases in animals.

What is needed is a device which is highly effective at preventing and treating foot diseases in livestock.

What is also needed is a device which will clean the hooves of livestock for proper exposure of infected areas of the hooves prior to application of treatment solutions.

What is also needed is a device which will clean the hooves of livestock for proper exposure of healthy hooves prior to application of prevention solutions.

What is also needed is a device which can fulfill the above functions without contaminating the udder of dairy cattle.

What is also needed is a device which is easy for producers and breeders to use and requires little maintenance.

What is also needed is a device which is easy for animals to walk through during normal maintenance.

SUMMARY OF THE INVENTION

The present invention substantially reduces or overcomes all of the above problems associated with the prior art. The invention is a low maintenance, electrically controlled automatic spray bath for cleaning animals and subsequently delivering measured dosages of medication at a continuous and consistent dosage rate for the prevention and treatment of diseases.

The invention may be employed wherever and whenever it is desired to clean and medically treat a large group of animals or people to prevent the spreading of disease. For example, the invention may be used with a herd of livestock, a new group of animals being entered into an animal shelter, or human victims of a tragedy, such as a large scale flood. The device is modular and portable and may be transported to any necessary location.

The automatic bath comprises at least one component for sequentially spray cleaning debris and organic matter from the animal and then spraying solutions for treating and preventing diseases. Pre-cleaning allows greater exposure of the problem area to the treatment or prevention solution.

In a preferred embodiment the wash and treatment areas are separated into two modular components. If further washing or treating is desired, additional components may be added.

A component comprises four rails defining an enclosure. Mounted on each rail of each component are a plurality of staggered nozzles for spraying the animal walking through the enclosure. The enclosures rest on the floor or the earth. The enclosures have no bottom panels.

The rails of the enclosures are mounted on beams to provide about an inch of space between the floor and the rails for flushing debris washed from the animals under the rails. Therefore, there is no debris build-up as with traditional baths to degrade the treatment and prevention solution.

The animals are led one after the other through the invention in one direction only. When one component is employed, the first few feet of the rails have nozzles that spray cleaning fluid on the animal and the next few feet of the rails have nozzles that spray treatment fluid. At the entrance end of the component and at the beginning of the treatment nozzles are electric eyes. When the beam of the electric eye is broken, spraying of the proper fluid is triggered.

In the embodiment comprising two components the animal is first led through the wash component and then the treatment and prevention component. Each component is portable and works independently of the other. As an animal steps into the entrance end of each enclosure, the animal passes through an electric eye beam to trigger spraying of the proper fluid.

In a preferred embodiment, the nozzles are mounted at a specific angle for cleaning the hooves of livestock. As an animal walks through each component, the front, back, sides, and as the animal lifts the feet to step, the bottoms of the feet are sprayed. When the livestock are dairy cattle, the nozzles are directed and pressurized so that little, if any, spray reaches the udder of a cow.

When the animal clears the entrance end of a component the electric beam is unbroken and the liquid delivery system automatically shuts off. In a preferred embodiment, a timer keeps the liquid delivery system open for a period of time to continue to spray the animal until the animal leaves the component.

The treatment solution is delivered to the nozzles by a metering device which ensures that each animal is exposed to the exact dosage of the treatment and prevention solution every time the animal walks through the treatment nozzles of the automatic spray bath. The metering device increases the efficacy and cost effectiveness of the treatment and prevention solution.

In another embodiment, the treatment component sprays a treatment foam onto the hooves instead of a treatment solution.

Unlike traditional foot baths, the separate wash and treatment components of the invention ensures that uncontaminated treatment and prevention solution is delivered to each animal as it passes through the automatic spray bath. Mounting each rail of each enclosure above surface level for providing a space for flushing debris under each rail constructed to rest above floor level further ensures that uncontaminated treatment and prevention solution is delivered to each animal as it passes through the automatic spray bath. Regardless of the order an animal enters the automatic spray bath, lesions will be washed clean of debris and each lesion will receive proper exposure to the treatment solution.

The metering device can be adjusted to deliver different dosages of treatment and prevention chemical if desired.

The automatic spray bath is easily regulated by a control panel containing several elements for delivering cleaning and treatment solutions. Any spray system to any component may be deactivated because occasionally, a producer or breeder may wish to use only one component. For example, a person may want to use the wash portion and a different means of applying treatment chemicals, for example, a traditional liquid filled foot bath containing other types of treatment chemicals.

All voltages on the bath are twelve volts, which eliminates exposure of the animals to potential lethal voltages.

Accordingly, it is an object of the present invention to provide an automatic spray bath for treating and preventing diseases.

It is also an object of the present invention to provide an automatic spray bath that will have increased efficacy in the treatment and prevention of foot diseases over traditional foot baths.

It is also an object of the present invention to greatly increase the exposure of lesions to the treatment solution by pre-cleaning the affected areas.

It is also an object of the present invention to greatly decrease the incidence of diseases by pre-cleaning healthy animals and subsequently spraying with a prevention solution.

It is also an object of the present invention to greatly reduce the contamination of the treatment solution by environmental refuse cleaned from the animal by continually flushing the refuse from the automatic spray bath.

It is also an object of the present invention to provide an automatic spray bath that will deliver an uncontaminated treatment and prevention solution dosage to each animal as it passes through the automatic spray bath.

It is also an object of the present invention to assure that each animal is exposed to the exact and correct dosage of the treatment and prevention solution every time the animal walks through the automatic spray bath.

It is also an object of the present invention to assure that the animals slowed with the discomfort and weakness of disease will receive the full, correct and uncontaminated dosage of treatment and prevention solution regardless of the order in which the animal passes through the automatic spray bath.

It is also an object of the present invention to provide an automatic spray bath that eliminates the high level of management required for traditional foot baths.

It is also an object of the present invention to provide an automatic spray bath that will have increased cost efficiency over traditional foot baths.

It is also an object of the present invention to be modular and portable.

Other objects and further scope of applicability of the present invention will become apparent from the detailed description given below. It should be understood, however, that this detailed description, while indicating preferred embodiments of the invention, is given by way of illustration only, since various changes and modifications within the spirit and scope of the invention will become apparent to those skilled in the art.

It is an advantage of this invention to provide a device that automatically cleans animals before application of the treatment solution, thereby significantly increasing efficacy of the treatment solution and reducing required time and costs.

It is an additional advantage of this invention to provide a device for automatically delivering the correct, uncontaminated treatment solution dosage to each animal, regardless of the order in which the animal entered the automatic spray bath.

It is an additional advantage of this invention to provide a device that automatically flushes the debris from the wash component thereby eliminating contamination of the treatment solution and minimizing effort of producers in effectively treating livestock.

It is an additional advantage of this invention to provide a device which is modular and portable for providing ease of placement at different locations for use.

BRIEF DESCRIPTION OF THE DRAWING

For a further understanding of the objects and advantages of the present invention, several embodiments are described in the following detailed description with reference to the accompanying figures, in which like parts are given like reference numerals and wherein.

DETAILED DESCRIPTION OF THE INVENTION

Figure 1:
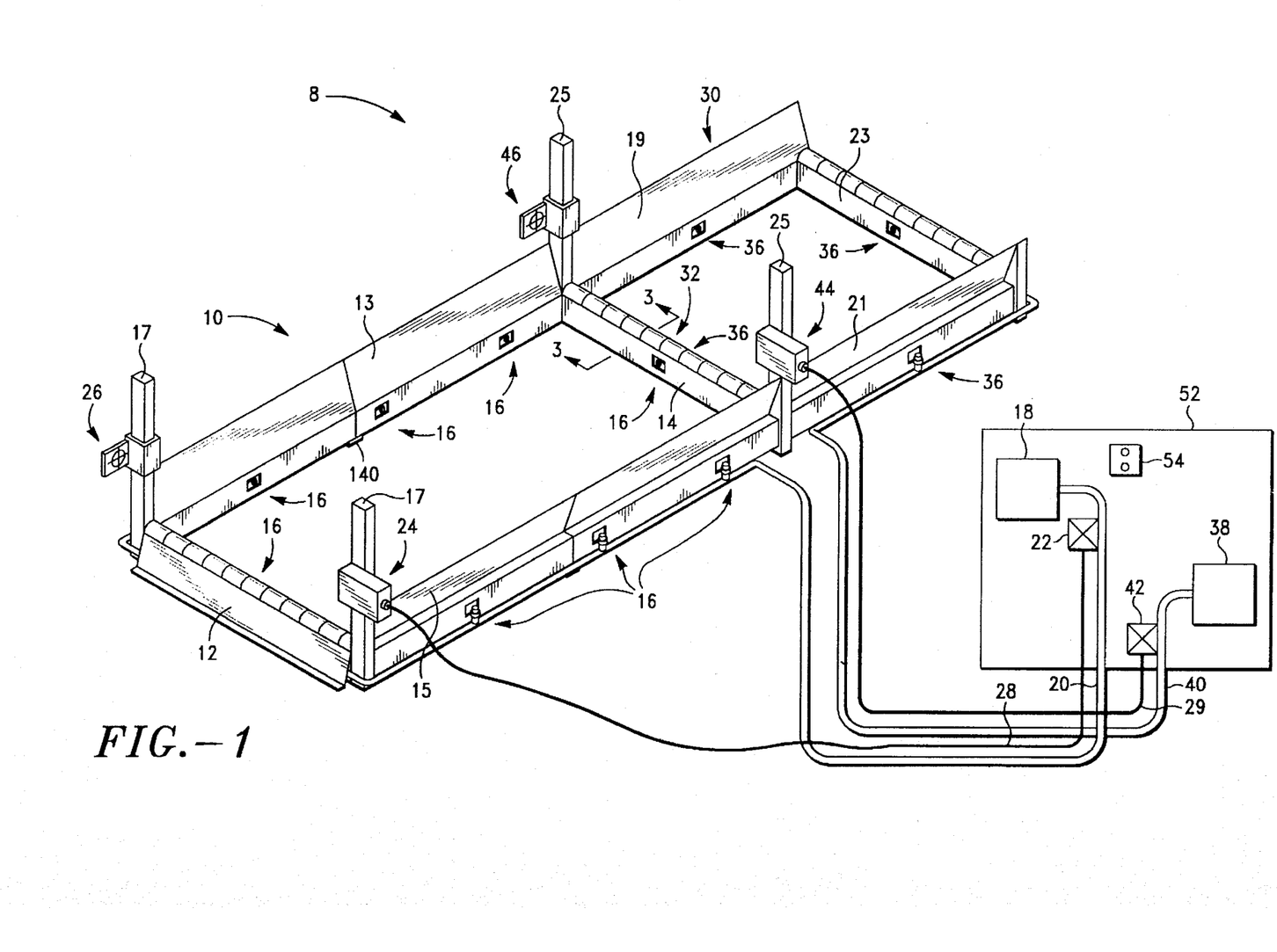
FIG. 1 is a pictorial diagram illustrating a first embodiment of an automatic spray bath in accordance with the present invention having a wash component and a treatment component.

FIG. 1 is a pictorial diagram illustrating a first embodiment of the automatic spray bath of the invention for washing and treating animals, denoted generally by the numeral 8. The automatic spray bath 8 includes a wash component 10, a treatment component 30, a control panel 52 having reservoirs 18, 38, interconnecting electrical cables 28, 29, and interconnecting fluid supply lines 20, 40.

The wash component 10 includes opposed end rails, entrance end 12 and exit end 14 and opposed side rails 13, 15 forming an enclosure through which the animals are walked through one by one. Cleaning nozzles 16 are disposed along the end rails 12, 14 and the side rails 13, 15 for directing a spray of cleaning liquid at a particular part of an animal. Two support posts 17 are located at opposed ends of entrance end rail 12 and support an electric eye 24 and light beam reflector 26.

The wash component 10 is open at the bottom and rests upon a concrete floor or upon the earth. The wash component 10 must be long enough to ensure adequate cleaning of the body parts to be treated. The side rails 13, 15 are mounted approximately 0.75" above the floor to permit debris washed from the animals to be flushed out of the defined enclosure. The rails 13, 15 are mounted above the surface level by beams 140, preferably by 12 gauge stainless steel mounts, under the end and center sections of each component of the bath. The mounts 140 and rails 15, 21 are strong enough to withstand kicking by livestock.

In an embodiment designed for washing and treating the hooves of dairy cattle, the defined enclosure is approximately 32" between the side rails 13, 15, and is approximately 8' from entrance end rail 12 to exit end rail 14. All rails are approximately 13 inches high.

The treatment component 30 is constructed similarly to the wash component 10. The treatment component 30 includes side rails 19, 21 and end rails, exit end 23 and entrance end 32. Typically, exit end rail 14 of wash component 10 is placed adjacent to entrance end rail 32 of treatment component 30. However, the components are modular and can be placed in any location desired. Treatment nozzles 36 are disposed along treatment component side rails 19, 21 and end rails 23, 32. Treatment nozzles 36 direct a spray of treatment solution at the animal as the animal walks through treatment component 30. Two additional support posts 25 are located at opposed ends of the entrance end rail 32 and support a second electric eye 44 and light beam reflector 46.

The rails of the treatment component 30 are also mounted approximately 0.75" above floor level to permit treatment fluid and additional debris to be flushed away. In the embodiment designed for washing and treating the hooves of dairy cattle, the treatment enclosure measures approximately 32" between opposed side rails 19, 21 and measures approximately 4' from entrance end rail 32 to exit end rail 23.

The dimensions of the enclosures must be varied according to the size of the animal to be cleaned and treated. For smaller animals such as dogs, the lengths of the components are not as long. To wash the sides of a horse, the rails are approximately three feet high.

The control panel 52 of the first embodiment ensures that cleaning fluid and treatment and prevention solution are delivered to the animal at a continuous, consistent dosage rate. The control panel includes an electrical control box 54, a reservoir 18 containing cleaning liquid, a reservoir 38 containing a treatment solution, and electrically operated check valves 22, 42. A supply line 20 carries cleaning liquid from the reservoir 18 to the cleaning nozzles 16. A second supply line 40 carries treatment solution from the reservoir 38 to the treatment nozzles 36.

The electrically operated check valve 22 is connected via electrical cable 28 to the electric eye 24 and controls the flow of the cleaning liquid through the supply line 20. The electrically operated check valve 42 is connected via electrical cable 29 to the electric eye 44 and controls the flow of the treatment solution through the supply line 40.

All voltages located on the automatic spray bath are twelve volts to eliminate exposure of the animals to potential lethal voltages.

In a typical operation the automatic spray bath 8 is used as follows. Animals step through the automatic spray bath one at a time. The animals enter the wash component 10 at entrance end 12 between the support posts 17, breaking the light beam between the electric eye 24 and the reflector 26. The broken beam causes the check valve 22 to allow cleaning liquid to flow from the reservoir 18 to the cleaning nozzles 16.

The animal continues to pass along the wash component 10, moving past the exit end rail 14. As the animal moves between the support posts 25 at entrance end 32, breaking the light beam between the second electric eye 44 and the reflector 46, the check valve 42 opens permitting treatment fluid to flow from the reservoir 38 to the treatment nozzles 36.

When the animal no longer breaks the first light beam, the electric eye 24 causes the check valve 22 to shut off the supply of cleaning liquid to the cleaning nozzles 16, and when the animal no longer break the second light beam, the electric eye 44 causes the check valve 42 to shut off the supply of treatment solution to the treatment nozzles 36.

In a preferred embodiment the end rails 12, 14, 23, 32 and the side rails 13, 15, 19, 21 are constructed of stainless steel. Alternatively these parts are made using injection molding or a vacuum forming process.

The cleaning liquid is a sprayable cleaning liquid such as ordinary tap water. When using tap water, the supply line 20 is attached to a commercial water supply. Alternatively, the water pressure is regulated by a pressure gauge. In another embodiment, a pump is used to deliver consistent water pressure.

In a preferred embodiment, the electric eyes 24, 44 and reflectors 26, 46 are manufactured by Banner Engineering Corporation, having 12 to 240 volt DC with SPDT Electromechanical relay output, model number Q85VR3LP-T9, and the check valves 22, 42 are Delavan 12 volt DC, model number 50140. A preferred electric eye includes a delay timer which, once activated by the light beam being broken, maintains the circuit for an adjustable 0–10 seconds. When the circuit is maintained, the check valve remains open and fluid continues to spray the animal and flush debris from the component. These devices operate at a safe 12 volt level and will not injure or frighten the animal in the event of an electrical failure.

In the preferred embodiment for cleaning and treating the hooves of livestock, the fluid sprayed from the cleaning nozzles 16 washes the manure, mud and other organic materials from the feet of the animal, exposing any diseases that may be present. The cleaning nozzles 16 are placed at both end rails 12, 14 and are staggered along both side rails 13, 15. The placement of the nozzles allows the front, back, sides, and as the animal lifts the feet to step, the bottoms of the feet to be washed.

When the livestock are dairy cattle, the cleaning nozzles 16 are located and correctly pressurized so that no spray from the cleaning liquid reaches the udders. The Applicants have found that a fluid pressure of approximately thirty (30) pounds from a commercially available nozzle, model TF-VS4 Turbo Flood, manufactured by TEE JET provides a desirable droplet size and spray pattern. This spray of fluid will clean the hooves and approximately four to six inches above the hair-line above the hooves, increasing exposure of any hoof disease in this area without causing a misting of the solution. Without misting, the cleaning liquid does not reach the udder of a cow and wash off chemicals applied to prevent mastitis. The pressure of the cleaning liquid is varied for other livestock to achieve a similar result.

In the preferred embodiment for cleaning and treating the hooves of livestock, the treatment nozzles 36 are placed to deliver the treatment solution to all areas of the hoof. The treatment and prevention solution can be any type of sprayable solution designed to treat and prevent hoof diseases. The same solution that is used as a treatment for infected hooves can be used as a prevention solution for healthy hooves. Applicants prefer HOOFPRO+, produced by the assignee of this invention, SSI Corporation. The treatment and prevention solution is sprayed onto the feet and covers the entire hooves, including any disease lesions located there that have been exposed by the wash component 10.

An advantage of the invention is that the treatment solution comes directly from the reservoir 38 and therefore is not contaminated with organic material stuck to hooves, as is the case in traditional foot baths in which the animals step into a shallow container filled with treatment solution.

When the livestock are dairy cattle, the treatment nozzles 36 for the treatment spray are located and pressurized so that there is little, if any, risk of misting of the treatment solution. Treatment and prevention solution misting must be avoided to prevent treatment and prevention solution from reaching the udder of the cow and washing off the post dip treatment chemical applied to prevent mastitis and to reduce the risk of obtaining treatment chemical residuals in the milk of the animal. The inventors have found that a pressure of approximately fifteen (15) pounds from a commercially available nozzle, model TF-VS4 Turbo Flood, manufactured by TEE JET effectively coats the hooves in treatment and prevention solution and prevents misting.

Figure 2:
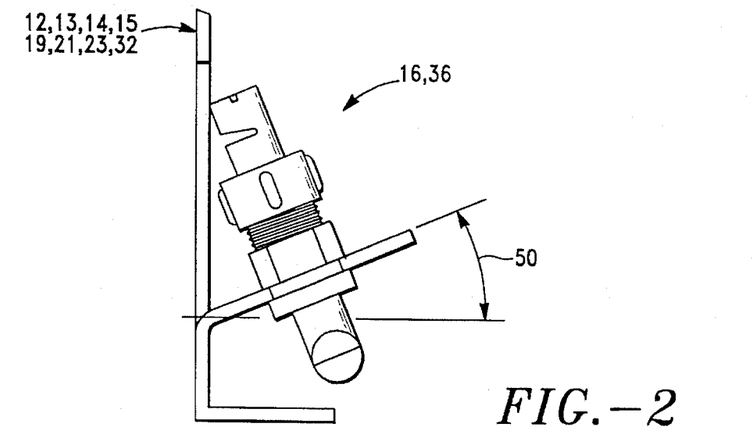
FIG. 2 is a side view of a nozzle illustrating a preferred mounting angle for washing and treating the hooves of dairy cattle.

FIG. 2 is a side view of a nozzle 16, 36 used in the wash 10 and treatment 30 components of the automatic spray bath 8 of FIG. 1, illustrating a preferable mounting angle on the rails 12, 13, 14, 15, 19, 21, 23, 32 for washing and treating the hooves of dairy cattle. The nozzles 16, 36 are placed at a twenty to twenty three degree angle 50 so that only the foot and approximately four inches of the leg are exposed to the wash and treatment and prevention solution.

In the body of each nozzle 16, 36 is a poly check valve (not shown). In a preferred embodiment, the poly check valve is manufactured by TEE JET, model number 11750. These check valves prevent the cleaning liquid or treatment and prevention solution from draining from the supply lines 20 and 40 when the components 10 and 30 are deactivated. Therefore, when either system is re-activated, cleaning liquid or treatment and prevention solution is immediately provided to the nozzles 16, 36. Immediate supply of fluid is necessary because any delay in cleaning liquid or treatment and prevention solution may allow an animal to pass through a component without being fully exposed to the fluid sprayed.

Figure 3:
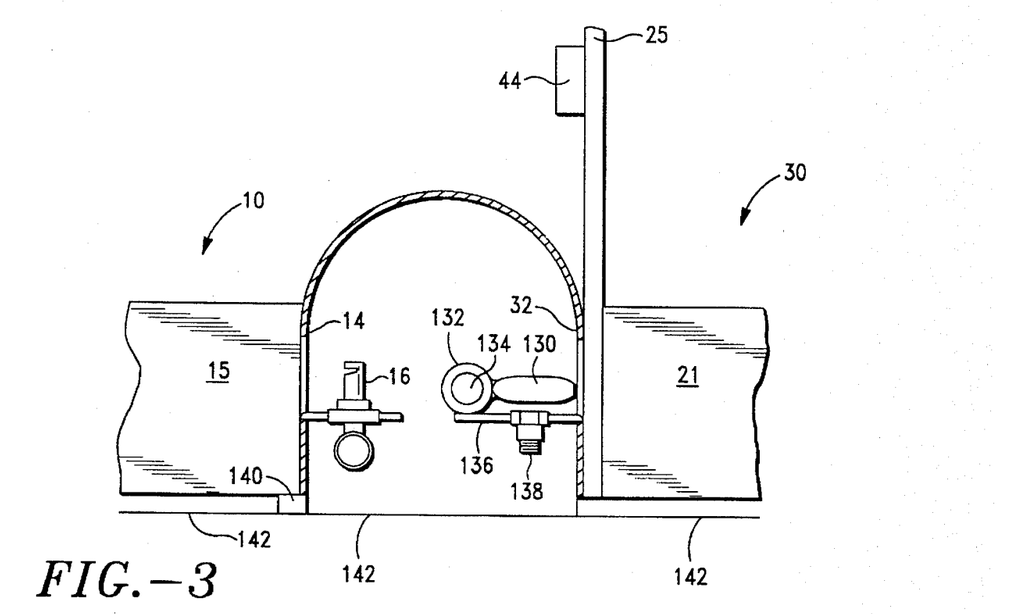
FIG. 3 is a view of the area between the exit end of the wash component and the entrance end of the treatment component, wherein the treatment component is employing foam treatment nozzles.

FIG. 3 is a view of the area between exit end 14 of the wash component 10 and the entrance end 32 of the treatment component 30 illustrating a second embodiment of the automatic spray bath 8. Shown in FIG. 3 are cleaning nozzle 16, foaming hardware 130–138, supporting beams 140, 25, electric eye 44, side rails 15, 21 and the floor 142.

In the second embodiment of the invention the treatment component 30 sprays a foam treatment and prevention chemical by employing foaming hardware 130–138. In effect, the treatment nozzles 36 of the treatment component 30 are replaced with foam treatment nozzles 130.

The foaming hardware consists of a nozzles 130, tube 132, tube attachments 134, plates 136 and a bolt 138. The existing treatment solution supply line 40 is connected to the tube 132 through tube attachments 134 attached at both ends of tube 132. The existing treatment solution supply line 40 supplies foam to the tube 132 to be sprayed through the nozzles 130. There is one foam treatment nozzle 130 mounted to the tube 132 to replace each treatment nozzle 36 of the embodiment of FIG. 1.

The tube 132 is attached to a plate 136 with a predrilled hole located to be bolted 138 directly to the mounting hole vacated by the treatment nozzles 36.

In a preferred embodiment, the tube 132 is a 16 gauge ½ inch, 304 stainless steel tube and the tube attachments 134 are ½ inch stainless steel hose barbs. A preferable foam nozzle is the number ¼ MEF Foam Jet Spray Nozzle, available from Spraying Systems Company, Denver, Colo. The plate 136 is a stainless steel mounting and attachment plate and is welded to tube 132.

A foaming agent is added to the treatment solution in reservoir 38. Standard foaming agents usable in the invention include Triton X100, Tergitol 15-S-9, Tergitol NP-9 and Van-Wet 9-N-9, available from most chemical companies, for example, Van Waters & Rogers, Inc., locations worldwide.

Figure 4:
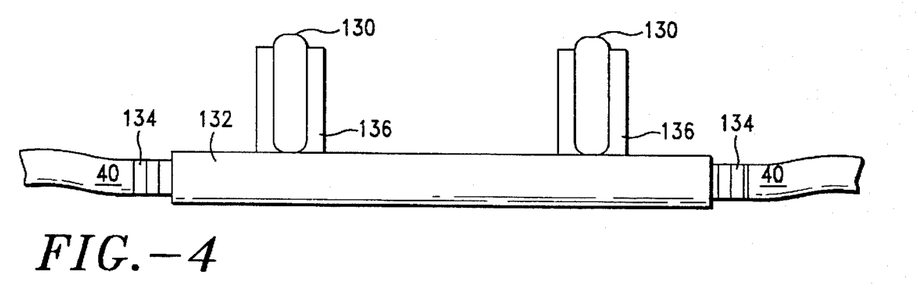
FIG. 4 is a top view of foam treatment nozzles of FIG. 5.

FIG. 4 is a top view of the foaming hardware 130–136 of FIG. 3 illustrating the relationship between the nozzles 130, tube 132, the tube attachments 134, treatment and prevention solution supply line 40 and the mounting and attachment plate 136.

Figure 5:
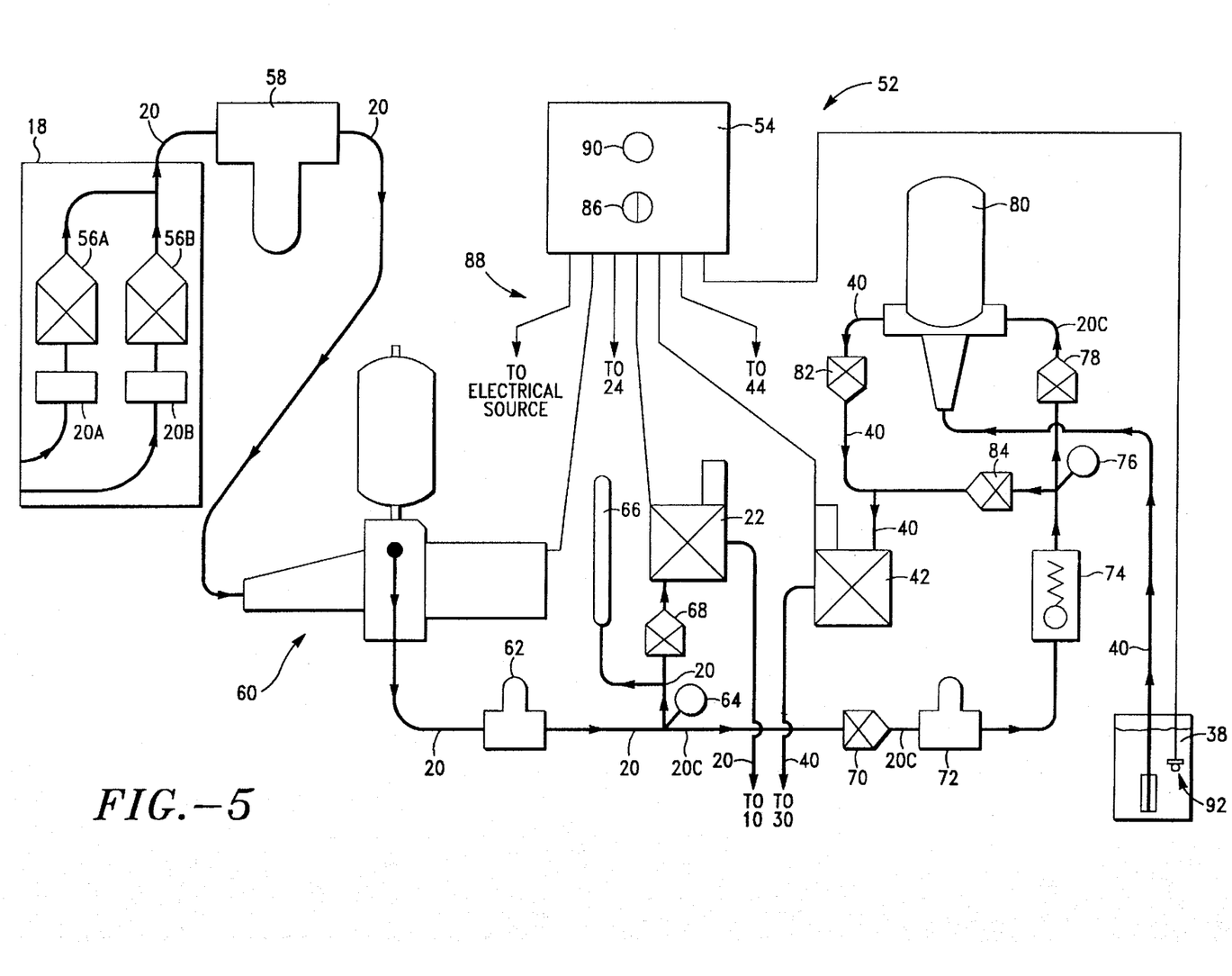
FIG. 5 is a schematic diagram of the control panel wherein arrows are drawn upon fluid supply lines for illustrating the direction of fluid flow to the two components for the embodiments of FIGS. 1, 2 and 3.

FIG. 5 is a schematic diagram of the control panel 52 of the embodiments of the invention having the ability to simultaneously provide two types of solutions. The arrows illustrate the direction of flow of the cleaning liquid from remote reservoir 18 through cleaning liquid supply line 20 to wash component 10 of FIG. 1, and the direction of flow of treatment solution from remote reservoir 38 through treatment solution supply line 40 to the treatment component 30 of FIG. 1.

The control panel 52 hangs on a wall or other suitable area near the automatic spray bath 8. The control panel 52 contains an electrical control box 54, several elements 20, 22, 56–68 for controlling the flow of the cleaning liquid from the remote reservoir 18 out of the cleaning liquid supply line 20 to wash component 10, and several elements 20C, 40, 42, 70–84 for controlling the flow of the treatment solution from remote reservoir 38 out of the treatment solution supply line 40 to treatment component 30. Additionally, the control panel 52 contains a low fluid level indicator 92, electrically attached to the electrical control box 54 and located in the remote treatment solution reservoir 38.

The wash elements 20, 22, 56–68 of the control panel 52 contain hot and cold water supply lines and valves 20A, 56A, 20B, 56B, a water filter 58, and a pump system. The pump system comprises a water pump 60, a manual regulator valve 62, a pressure gauge 64, and a water hammer eliminator 66. Additional wash elements of the control panel 52 include a manual valve 68 and an electrically operated check valve 22. The flow of cleaning fluid ends with the cleaning liquid supply line 20 sending cleaning liquid to wash component 10.

The treatment elements of the control panel begin with a portion of the water supply line 20C, after it breaks off from the main water supply line 20 at pressure gauge 64. The treatment elements continue with a manual water valve 70, a water regulator valve 72, a treatment solution back flow check valve 74, a pressure gauge 76, a manual valve 78, a metering device 80, manual valves 82, 84, electrically operated check valve 42. The flow of treatment fluid ends with the treatment solution supply line 40 sending treatment solution to treatment component 30.

In a typical operation, before an animal steps into the first component, the fluid of the control panel 52 flows as follows. First, cleaning liquid from remote reservoir 18 is provided. In one embodiment of the invention, a cleaning chemical requiring mixing with water is used and both cleaning chemical reservoirs and water reservoirs are provided. In a preferred embodiment of the invention, the cleaning liquid is water, therefore, the remote reservoir 18 is the house water supply. The remainder of this description describes the control panel when the cleaning liquid is water.

The cleaning liquid travels through supply lines 20. In FIG. 5, there are two supply lines from the source, one for hot water 20A and one for cold water 20B.

The cleaning liquid supply line 20 contains a manual valve 56 for opening and closing the supply line 20. In FIG. 5, there are two manual valves 56, one 56A for the hot water supply line 20A, and one 56B for the cold water supply line 20B.

In a preferred embodiment, recovered water is employed by farmers and a spin off filter 58 is used to filter debris to prevent clogs in the pump, check valves, metering device and or nozzles as the house water flows through supply line 20.

Next, a water pump 60 supplies consistent water pressure in the event of a drop in the house supply water pressure. In a preferred embodiment, the water pump is a Teel cast-iron standard jet pump with a precharged 2 gallon tank, ⅓ HP split phase 115/130 volt motor, model number 1P979G.

Next, the water flows through a manually adjusted cleaning liquid regulator valve 62 which limits the cleaning liquid traveling to the wash component 10 to thirty (30) pounds of pressure. In a preferred embodiment, the regulator valve 62 is manufactured by WATTS, model number 25AVB STD.

Next, the water flows through a pressure gauge 64, which accurately sets and monitors the pressure of the fluid going to the wash component 10 according to the adjustment made to the regulator valve 62. In a preferred embodiment, the pressure gauge 64 is manufactured by Precision Fitting & Valve Company, model number GG100.

Next, the water flows through a water hammer eliminator 66, which prevents damage from pulsating fluid pressure in the supply line 20. In a preferred embodiment, the water hammer eliminator is manufactured by Sioux Chief Manufacturing Company, model number 653-B.

Next, the water flows through a manual valve 68, which opens and closes the cleaning liquid supply line 20 leading to the wash component 10 check valve 22. This valve allows the operator to manually bypass the wash system independently of the control box switch 86, discussed below. In this manner, if there is a failure of the electric control switch 86 on the electrical control box 54, necessary repairs to the electric switch 22 and wash portion of the control system plumbing may be made without disabling all of the control system plumbing.

When an animal steps into the wash component, the check valve 22 opens the supply line 20 according to the electrical signal sent from the electric eye 24 located at the entrance 12 of the wash component 10. When the check valve 22 opens, water flows through the cleaning liquid supply line 20, exits the control panel 52, and leads to the wash component 10.

The second part of the automatic spray bath process is the treatment and prevention solution supply to the treatment component 30. Before an animal steps into the second component, the fluid of the control panel flows as follows. A water supply line 20C breaks off from the main water supply line 20 at pressure gauge 64 to supply water to the treatment fluid lines 40.

The water flows through manual valve 70 which opens and closes the water supply line 20C that leads to the treatment and prevention metering device 38. Valve 70 allows an operator to manually bypass the treatment component elements on the control panel in case of electric failure in the control switch 86. Manual control allows bypass so that repairs can be made to the treatment component if necessary.

Next, the water flows through manually adjusted regulator valve 72, which can be adjusted to limit the fluid pressure to the treatment and prevention component 30 to fifteen (15) pounds. In a preferred embodiment, the regulator valve 72 is manufactured by WATTS, model number 263A. Regulator valve 72 is a lighter version than regulator valve 62 because of the lighter water pressure.

Next, the water flows through back flow check valve 74, which restricts the treatment and prevention solution from entering the water supply lines 20C, 20 and causing chemical contamination to the water supply or ground water. In a preferred embodiment, the back flow check valve is manufactured by Hayward Industrial Products, Inc., model number TC 10050 ST.

Next, the water flows through pressure gauge 76, which accurately sets and monitors the pressure of the water going to the component 30 according to the adjustment made to the pressure regulator valve 72. In a preferred embodiment, the pressure gauge 76 is manufactured by Precision Fitting & Valve Company, model number GG30. Pressure gauge 76 is a lighter version than regulator valve 64 because of the lighter water pressure.

Next, the water flows through metering device 80 which also receives treatment chemical from the remote reservoir 38. The metering device 80 accurately blends the treatment and prevention chemical and water to be supplied to the treatment and prevention component 30. The metering device 80 is adjustable to deliver different dosage rates of treatment and prevention chemical when needed. A preferable metering device is manufactured by Dosmatic, model number DP30.

Next the fluid flows through a set of manual valves 78, 82 and 84 for regulating whether or not water is mixed with the treatment solution or whether or not treatment solution will be sent through treatment solution supply line 40 into the treatment component 30. Valve 78 opens and closes the water line 20C leading to the treatment and prevention metering device 80. This valve allows the metering device 80 to be bypassed when the farmer does not want to add treatment or prevention chemical to the system, but wants the treatment and prevention portion of the automatic spray bath to function as an additional wash portion. By manually closing valves 78 and 82, and manually opening valve 84, the metering device 38 is bypassed but the treatment and prevention portion of the bath sprays water and acts as an additional wash system. Valve 84 is normally in a closed position, thus allowing water to flow through valve 78 into the metering device 38 where treatment and prevention chemical is injected.

Next the treatment solution leaves the metering device 80 and continues on through valve 82, through hose 40 to electric switch 42.

When an animal steps into the treatment component 30, check valve 42 opens the treatment solution supply line 40 according to the electrical signal sent from the electric eye 44 located at the entrance 32 of the treatment and prevention component 30.

Completing the treatment fluid flow of the automatic spray bath process is the treatment and prevention solution line 40 exiting the control panel 52 and sending fluid to the treatment and prevention component 30.

Also shown in FIG. 5 is the electrical control box 54. On the electrical control box 54 is a manual switch 86, an indicating light 90 and power supply lines 88. Manual switch 86 allows the automatic spray bath to function in four ways: wash component 10 only, treatment and prevention component 30 only, both wash 10 and treatment and prevention 30 components off, and both wash 10 and treatment and prevention 30 components on.

Also shown in FIG. 5, is a low fluid level indicator 92, located in the remote reservoir 38 and electrically connected to the electrical control box 54. When the treatment fluid is low, the low fluid level indicator 92 sends current to the indicating light 90 on the electrical control box 54, thereby illuminating indicating light 90.

The power supply lines 88 attach to a commercial electrical source, the water pump 60, the electric eye 24 of the wash component 10, the check valve 22 on the cleaning liquid supply line 20, the check valve 42 on the treatment solution supply line 40, the electric eye 44 of the treatment and prevention component 30, and the low fluid level indicator 92.

In alternative embodiments, additional treatment components are added to the device. In these embodiments, a third remote reservoir is connected to a third set of treatment solution delivery systems equivalent to the fluid flow elements 20C, 40, 42, 70–84 of the control panel described above for the treatment and prevention solution.

Figure 6:
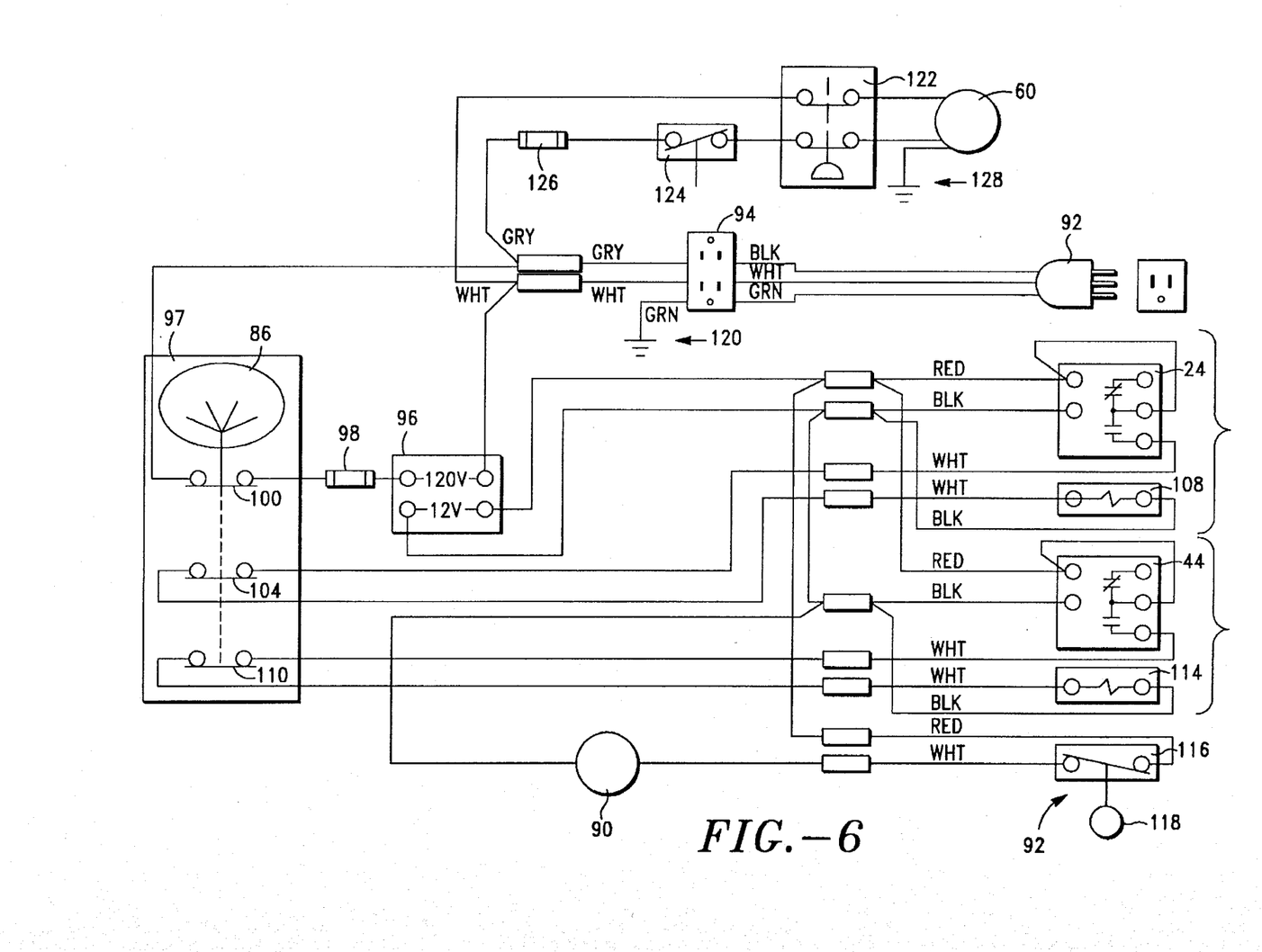
FIG. 6 is a diagram of the electrical control circuit of the embodiments of FIGS. 1, 2 and 3.

FIG. 6 is a diagram of the electrical control circuit located inside the electrical control box 54 of the embodiments of the invention having the ability to simultaneously provide two types of solutions. The circuit comprises a plug 92, a ground fault circuit interrupter 94, a power supply 96, a switch 97, water pump motor 60, water pump pressure switch 122, water pump on-off toggle switch 124, two electric eyes 24, 44, two valve assemblies 108, 114, a low fluid level indicator 92 and indicator light 90.

All wiring elements of the invention are standard in the art and can be purchased at electronic hardware and supply stores.

The automatic spray bath plugs into a standard commercial AC outlet of 120 V, 60 Hz having a ground connection 120. The AC current flows through the ground fault circuit interrupter 94 through contact 100 in the switch 97, through the fuse 98 and into the power supply 96 where it is converted to 12 V DC.

The automatic spray bath switch 86 has four settings: wash component only (WASH), treatment component only (TREAT), both components on (BOTH) or both components off (OFF). When the switch 86 is in the OFF position, the contact 100 opens and AC current is not supplied to the power supply 96. When the switch 86 is in any of the other three positions, the contact 100 closes and current is supplied to the power supply 96.

When the switch 86 is in either the WASH position or BOTH position, the second contact 104 closes and current is supplied to the wash component electric eye 24 and wash component valves 108. When the switch 86 is in either the TREAT or OFF position, the second contact 104 opens and no current is supplied to the wash elements 24, 108.

Similarly, and independently, when the switch 86 is in either the TREAT position or BOTH position, the third contact 110 closes and current is supplied to the treatment component electric eye 44 and treatment component valves 114. When the switch 86 is in either the WASH position or OFF position, the third contact 110 opens and no current is supplied to the treatment component elements 44, 114.

Attached to all valves 108, 114 are two electrical wires and one fluid supply line 20, 40 (not shown). All valves 108 for the wash component are electrically connected together in parallel, and all valves 114 for the treatment component are electrically connected together in parallel. Each valve must have 12 V supplied to it in order to open, allowing fluid to flow through the fluid supply lines 20, 40 to eventually spray from the nozzles 16, 36 (shown in FIG. 1).

In typical operation, after the automatic spray bath is plugged in, an operator manually selects the operation of the switch 86. When either the WASH or BOTH position is chosen, DC current is supplied to the wash component electric eye 24. When the electric beam in the wash component is broken, a contact in the electric eye 24 applies 12 V DC to the wash component valves 108, and all wash component valves 108 open simultaneously, thereby spraying cleaning liquid onto the animal in the wash component 10. When the electric beam is unbroken, the timer in the electric eye 24 keeps the valves 108 open for the pre-selected period of time. After the pre-selected period of time ends, the contact in the wash component electric eye 24 opens, electricity is no longer supplied to the wash component valves 108, the valves 108 close and the cleaning liquid is no longer sprayed from the cleaning nozzles 16 (not shown).

Similarly, and independently, when either the TREAT or BOTH position is selected, current is supplied to the treatment component electric eye 44. When the electric beam in the treatment component is broken, a contact in the electric eye 44 applies 12 V DC to the treatment component valves 114, and all treatment component valves 114 open simultaneously, thereby spraying treatment solution onto the animal in the treatment component 30. When the electric beam is unbroken, the contact in the treatment component electric eye 114 opens, electricity is no longer supplied to the treatment component valves 114, the valves 114 close and the treatment solution is no longer sprayed from the treatment nozzles 36 (not shown).

In alternative embodiments, additional treatment components are added to the device. In these embodiments, the switch 86 is expanded to include ON and OFF positions for the additional components. A circuit equivalent to the 110 switch, 44 electric eye and 114 valve switch circuit of treatment component 30 is added for each additional treatment component.

Apart from the wash and treatment components of the invention is a float operated "low fluid level" indicator 92, comprising switch 116 and float 118. Switch 116 is electrically connected to the power supply 96 and indicator light 90 and operated by a float 118 in the remote reservoir 38. When the switch 86 is in one of the three "on" positions, current is supplied to the power supply 96. When the treatment fluid level is high, the float 118 holds the float switch 116 open so that current is not supplied from the power supply 96 to the indicator light 90. As the fluid level drops, the float 118 drops accordingly. When the float 118 reaches a level low enough to cause the float switch 116 to close, current is supplied to indicator light 90, turning on indicator light 90, alerting an operator that the treatment solution fluid level is low. In a preferred embodiment, the low fluid level indicator 92 is manufactured by IMO Industries, Gems Sensors Division, model number LS-1750.

Additionally, when the switch 86 is in one of the three "on" positions and current is supplied to the power 96, 12 V DC current is also supplied to the water pump assembly provided by the manufacturer. 12 V DC current is supplied to the water pump motor 60 through a water pump pressure switch 122. Within this circuit is also a water pump on-off-toggle switch 124, a fuse 126 and an additional ground 128. The water pump pressure switch 122 keeps the water pressure within 20–40 pounds. The on-off toggle switch 124 is located on the side of the control panel (not shown in FIG. 5). The toggle switch allows for manually shutting on and off the pump as needed.

The automatic spray bath is designed to be low maintenance during operation. In typical operation, an operator merely selects a position for switch 86 on the electrical control box 54 to turn on the components the producer desires to use and guides the animals through the bath. The wash and treatment solutions are automatically measured and applied and the bath is continuously flushed so that there is no degradation of the cleaning or treatment solution. The operator need only keep an eye on the pressure gauges 64, 76 and low treatment solution level light 90.

Figure 7:
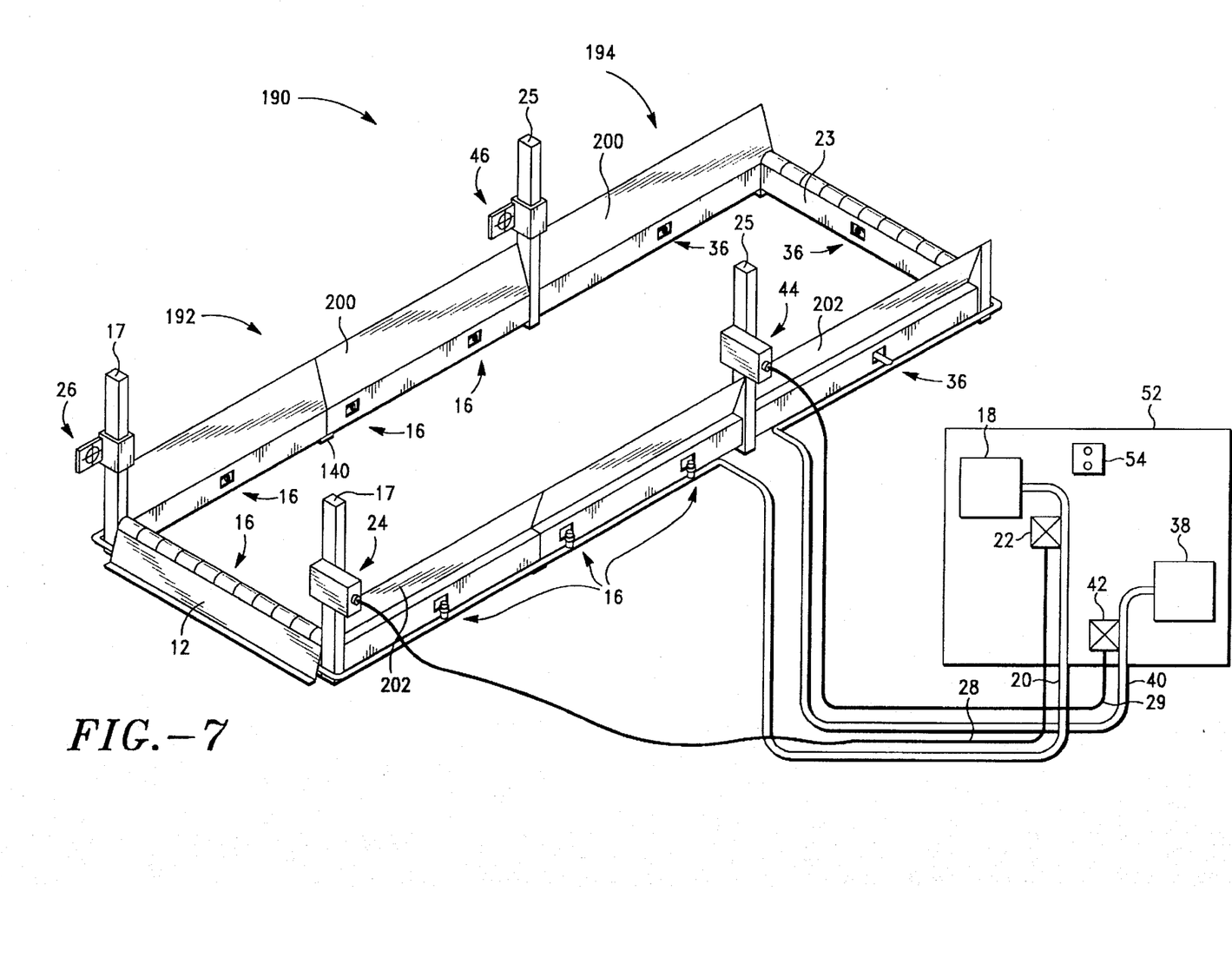
FIG. 7 is a pictorial diagram illustrating a third embodiment of the automatic spray bath in accordance with the present invention having one component with both a wash area and a treatment area.

FIG. 7 is a pictorial diagram illustrating a third embodiment of the automatic spray bath in accordance with the present invention having one component 190 with both a wash area 192 and a treatment area 194. In this third embodiment, the difference from the first embodiment is that the side rails 200, 202 now run the length of the bath as opposed to the two sets of side rails 13, 15 and 19, 21 of FIG. 1. There is no division between the components. All other elements are the same as in the first and second embodiments, and labeled consistently with FIG. 1. When the single component 190 is designed to wash the hooves of dairy cows, the component 190 is about 12 feet long. Approximately the first eight feet of the rails 200, 202 have cleaning nozzles 16 that spray cleaning fluid on the animal and approximately the next four feet of the rails 200, 202 have treatment nozzles 36 that spray treatment fluid. At the entrance end of the component and at the beginning of the treatment nozzles are electric eyes 24, 44. When the beam of one of the electric eyes 24, 44 is broken, spraying of the proper fluid is triggered as described earlier. The solution delivery system and electrical systems are the same for this third embodiment 190 as the first and second embodiments as shown in FIGS. 5 and 6.

Figure 8:
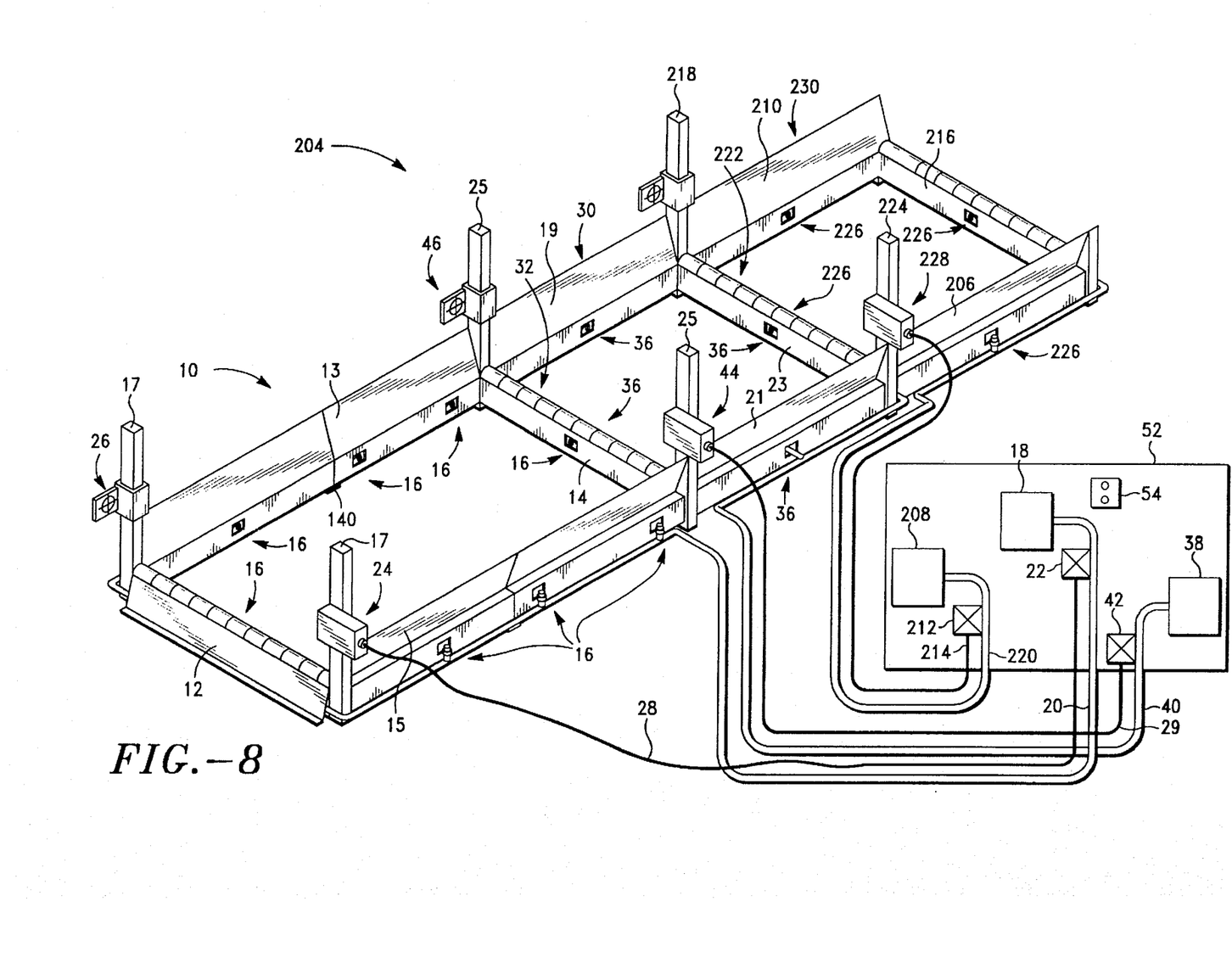
FIG. 8 is a pictorial diagram illustrating a fourth embodiment of the automatic spray bath in accordance with the present invention having one wash component and two treatment components.

FIG. 8 is a pictorial diagram illustrating a fourth embodiment 204 of the automatic spray bath in accordance with the present invention having one modular wash component 10 and two modular treatment components 30, 230. An additional remote reservoir 208 containing a treatment and prevention solution and an additional solution delivery system (not shown) are placed in the control panel 52 and functionally connected to the treatment nozzles 226 of the additional treatment component 230.

Therefore, if a producer or breeder preferred to spray a second type of treatment solution on the animals, the animals would first be walked through the wash component 10, then the first treatment and prevention component 30 and then the second treatment and prevention component 230. The solution delivery systems and electrical systems of FIGS. 5 and 6 are expanded accordingly.

If additional washing or treating is desired, additional modular units may be added with concomitant electrical and fluid flow systems being expanded as in FIG. 8, or the length of a single component may be built having a length greater than 12 feet as shown in FIG. 7. Alternatively, a combination of the two embodiments may be built; additional units may be added, other components may be built at lengths differing from the examples disclosed.

For smaller animals, the components and the washing and treatment areas may be constructed with shorter lengths.

While the foregoing detailed description has described a first embodiments of the electrically controlled automatic spray bath with respect to cleaning and treating the hooves of dairy cattle in accordance with this invention, it is to be understood that the above description is illustrative only and not limiting of the disclosed invention. It will be appreciated that the same techniques can be utilized for both shorter and taller animals and for humans, and for mounting the nozzles in a different angle for targeting another part of the body. The automatic spray bath can be utilized for many types of cleaning liquids, as well as for different types of sprayable treatment and prevention solutions. Additionally, the design lends itself toward both permanently fixed and portable automatic spray baths having one or more components. Thus the invention is to be limited only by the claims as set forth below.

What is claimed is:

1. A device for cleaning animals and treating diseases, infections and abrasions thereof, comprising:

at least one component for cleaning and subsequently treating an animal;

each component having opposing side rails and opposing end rails defining an enclosure through which the animals are walked on a single direction one after the other, one end rail of each component being an entrance end for the animal; and a plurality of nozzles attached to each rail of each component, the plurality of nozzles being subdivided into sets of nozzles, each of the nozzles being mounted to direct a spray of fluid to a pre-determined body part of the animal, such that the animal first passes a set of cleaning nozzles and subsequently passes at least one set of treatment nozzles whereby as the animal walks through the device, the pre-determined body part of the animal is spray cleaned and then chemically treated.

2. The device according to claim 1 further comprising:

means mounted by a first nozzle of each set of nozzles for detecting the presence of the animal;

a first remote reservoir having a cleaning liquid and at least one subsequent remote reservoir, each subsequent remote reservoir having a treatment solution, the number of subsequent remote reservoirs equaling the number of subsequent sets of treatment nozzles;

means connected to the first remote reservoir for directing the cleaning liquid from the first remote reservoir to spray through the plurality of cleaning nozzles to the animals when one of the animals is detected at the first cleaning nozzle; and means connected to each of the subsequent remote reservoirs for directing the treatment solution from the subsequent remote reservoirs to spray through the subsequent set of treatment nozzles to the animals when one of the animals is detected at the first nozzle of each set of the subsequent treatment nozzles whereby when the animal walks through the device, the animal trips the sensing means near the first cleaning nozzles, is sprayed with cleaning fluid as it walks through the set of cleaning nozzles, trips the sensor near the first set of treatment nozzles, is sprayed with treatment fluid as it walks through the first set of treatment nozzles, and subsequently trips additional sensors near the first nozzle of each subsequent set of treatment fluids until the animal exits the device.

3. The device according to claim 1 wherein each component is modular and portable.

4. The device according to claim 1 wherein each component rests upon a surface and each rail is constructed above surface level for providing a space between each rail and the surface for flushing and draining refuse and excess fluid from each component.

5. The device according to claim 1 wherein at least one of the subsequent remote reservoirs contains a cleaning fluid.

6. The device according to claim 2 wherein the means for detecting the animal in each component is an electric eye.

7. The device according to claim 2 wherein the device is comprising:

a first component for cleaning the hooves;

a second component for treating the hooves;

a plurality of cleaning nozzles attached to each rail of the first component;

a plurality of treatment nozzles attached to each rail of the second component;

means mounted on the entrance end of each component for detecting the presence of the animal;

a first remote reservoir having a cleaning liquid and a second remote reservoir having a treatment solution;

means connected to the first remote reservoir for directing the cleaning liquid from the first remote reservoir to spray through the plurality of cleaning nozzles to the hooves of the animal when one of the animals is detected in the first component; and means connected to the second remote reservoir for directing the treatment solution from the second remote reservoir to spray through the plurality of treatment nozzles to the hooves of the animal when one of the animals is detected in the second component.

8. The device according to claim 7 wherein the end rail opposing the entrance end of each component being an exit end for the animals, and the exit end of the first component being placed adjacent to the entrance end of the second component.

9. The device according to claim 8 wherein the first component is approximately eight feet long.

10. The device according to claim 9 wherein each electric eye comprises a timer for keeping each check valve open for a time period after the electric beam is unbroken for continually flushing debris after the animal completes the pass through the eye beam.

11. The device according to claim 10 wherein each nozzle contains a nozzle check valve for preventing fluid from draining from each supply line after each supply line check valve closes, whereby fluid is immediately available to each nozzle when a subsequent animal breaks each electric beam.

12. The device according to claim 11 wherein the means connected to each remote reservoir for directing each fluid from each remote reservoir through the plurality of nozzles further includes a pump system for supplying consistent liquid pressure to each nozzle.

13. The device according to claim 12 further comprising an adjustable metering device on the treatment solution supply line for measuring and blending a dosage of a treatment chemical from the treatment solution remote reservoir to be supplied to the plurality of treatment nozzles.

14. The device according to claim 1 wherein the cleaning liquid is water.

15. The device according to claim 1 wherein all voltages on the device are twelve volts.

16. The device according to claim 1 further comprising a control box electrically connected to the cleaning liquid check valve and to the treatment solution check valve for independently regulating each component.

17. The device according to claim 13 wherein the means connected to each remote reservoir for directing each fluid from each remote reservoir through the plurality of nozzles comprises:

a cleaning liquid supply line having a cleaning liquid check valve, the cleaning liquid supply line connecting the remote cleaning liquid reservoir to the plurality of cleaning nozzles;

a treatment solution supply line having a treatment solution check valve, the treatment solution supply line connecting the remote treatment solution reservoir to the plurality of treatment nozzles;

each check valve being for opening and closing each supply line; and the cleaning liquid check valve being electrically connected to the electric eye of the first component and the treatment solution check valve being electrically connected to the electric eye of the second component, such that when an electric beam of the electric eye of one of the components is broken when one of the animals enters the component, the check valve of the entered component opens the supply line and the fluid sprays from the plurality of nozzles onto the hooves, and when the electric beam is unbroken when the animal completes a pass through the eye beam, the check valve of the entered component closes the supply line and the fluid stops spraying from the plurality of nozzles.

18. The device according to claim 17 wherein the animals are dairy cows and each nozzle is mounted on each rail at an angle within the range of twenty to twenty three degrees whereby only the hooves and approximately four inches of legs above the hooves are exposed to each fluid sprayed from each nozzle.

19. The device according to claim 18 wherein the pressure of the cleaning liquid supplied to the plurality of cleaning nozzles is approximately 30 pounds.

20. The device according to claim 19 wherein pressure of the treatment solution supplied to the plurality of treatment nozzles is approximately 15 pounds.

* * * * *